United States Patent [19]

Braun

[11] 4,375,522
[45] Mar. 1, 1983

[54] THIXOTROPIC RESTRICTOR, CURABLE AT ROOM TEMPERATURE, FOR USE ON SOLID PROPELLANT GRAINS

[75] Inventor: John D. Braun, Ridgecrest, Calif.

[73] Assignee: The United States of America as represented by the Secretary of the Navy, Washington, D.C.

[21] Appl. No.: 170,355

[22] Filed: Jul. 21, 1980

[51] Int. Cl.³ .............................................. F42B 1/00
[52] U.S. Cl. ...................................... 523/180; 149/2; 102/290
[58] Field of Search .................. 149/19.92; 102/290; 523/180

[56] References Cited

U.S. PATENT DOCUMENTS

| | | | |
|---|---|---|---|
| 3,433,158 | 3/1969 | Pierce | 102/290 |
| 3,507,114 | 4/1970 | Webb | 102/290 |
| 3,801,385 | 4/1974 | Mastrolia et al. | 149/20 |
| 3,813,308 | 5/1974 | Skidmore | 149/109 |
| 3,855,176 | 12/1974 | Skidmore | 260/42.28 |
| 3,932,353 | 1/1976 | Mastrolia et al. | 260/45.75 |
| 3,984,265 | 10/1976 | Elrick et al. | 149/19.9 |
| 4,034,676 | 7/1977 | Daume | 102/290 |
| 4,084,992 | 4/1978 | Hightower et al. | 149/199 |
| 4,187,215 | 2/1980 | Wrightson | 102/290 |

*Primary Examiner*—Edward A. Miller
*Attorney, Agent, or Firm*—R. F. Beers; W. T. Skeer; B. H. Cottrell

[57] ABSTRACT

A solid propellant restrictor for preventing erosive burning in solid propellant grain critical areas is described. The restrictor is a mixture of hydroxyl-terminated polybutadiene with 1% by weight of dissolved 2,2'-methylene-bis(4-methyl-6-tert-butyl) phenol, dioctyl adipate, triethanolamine, ferric acetylacetonate, carbon black, aluminum oxide, silicon oxide, and toluene diisocyanate, curing at room temperature and illustrates superior hardening, adhesive, and application properties.

4 Claims, No Drawings

THIXOTROPIC RESTRICTOR, CURABLE AT ROOM TEMPERATURE, FOR USE ON SOLID PROPELLANT GRAINS

BACKGROUND OF THE INVENTION

1. Field of the Invention

This invention relates to a process for making a solid rocket motor propellant grain restrictor and its application and use in the prevention of erosive burning and pressure buildup (spiking) upon ignition.

2. Description of the Prior Art

An earlier epoxy-resin-based restrictor for use with a carboxyl-terminated polybutadiene (CTPB) propellant grain for the MK56 rocket motor tends to harden excessively upon aging. This reduces restrictor strain capability and bond strength, often resulting in separation of the restrictor from the propellant. The epoxy-based restrictor also causes the CTPB propellant grain to harden, resulting in grain cracking.

These defects can cause catastrophic failure when the motor is fired. Furthermore, the epoxy-based restrictor is excessively fluid and tends to "run" after its application and before it solidifies, i.e. "cures". In order to prevent such "running", it is necessary to rotate the motor during cure, or to apply and cure the restrictor on one "flat" or "ray" of the grain perforation at a time. This results in increased man-hours for the application of the restrictor to the propellant grain.

There is a need for a restrictor which is easy to apply, cures at room temperature, and prevents cracking and hardening of the propellant grain. Such a restrictor, having superior strain and adhesive properties, is not found in the previous art.

SUMMARY OF THE INVENTION

The present invention relates to a method for preparing a solid rocket motor propellant grain restrictor which prevents chamber pressure buildup (spiking) and erosive burning upon ignition. This restrictor can be used on any hydroxyl-terminated polybutadiene (HTPB) propellant grain and on various polyurethane propellant grains which employ an isocyanate cure.

OBJECTS OF THE INVENTION

One object of the present invention is to restrict the critical areas of a solid propellant grain by coating these areas with a relatively noncombustible material that will adhere to these areas and prevent them from igniting until neighboring uncoated areas have ignited and are burning steadily.

Still another object is to make a restrictor which has a thixotropic nature, so that it does not "run" while it is being applied to the propellant grain nor during its cure.

Another object is to make a restrictor which cures at room temperatures (70°–75° F.), thus eliminating the need for a hot oven.

And still another object is to make a restrictor which does not excessively harden, nor cause the propellant grain to crack, and which does not lose strain capability and adhesive strength properties upon aging.

These and other objects and advantages of this invention are apparent in the following detailed description.

DESCRIPTION OF THE PREFERRED EMBODIMENT

The restrictor composition disclosed herein solves the aforementioned problems. The following Table I lists the ingredients, their preferred weight percentages, and the order and method for mixing them. Table II enunciates and illustrates the invention's physical properties.

This restrictor was developed for use in the new MK56 standard missile rocket motor which employs a solid propellant grain consisting of aluminum fuel, ammonium perchlorate oxidizer, and a diisocyanate-cured hydroxyl-terminated polybutadiene (HTPB) binder. However, it can be used with other propellant grains as previously mentioned.

TABLE I

PREMIX:

| Material | Percentage (%) by weight |
|---|---|
| hydroxyl-terminated polybutadiene (HTPB) binder (R45M type) with 1% by weight of dissolved 2,2-methylene-bis(4-methyl-6-tert-butyl)phenol | 32.932 |
| dioctyl adipate (DOA) plasticizer | 12.173 |
| triethanolamine (TEA) x-linker | 0.244 |
| ferric acetylacetonate (FeAA) catalyst | 0.235 |
| carbon black | 0.469 |
| aluminum oxide ($Al_2O_3$), hydrated | 48.787 |
| Cabosil ($SiO'_2$ colloidal) | 5.160 |
|  | 100.000 |

INGREDIENT ADDITION ORDER:

| Material | Mixing Time | Temp °F. material | Temp °F. mixer jacket | Vacuum inches Hg |
|---|---|---|---|---|
| HTPB, DOA, TEA, FeAA | 1 min. | by hand in beaker | | |
| HTPB, DOA, TEA, FeAA | 5 min. | 123 | 134 | 24" |
| $Al_2O_3$, ⅓rd | 2 min. | 123 | 134 | 24" |
| $Al_2O_3$, ⅓rd | 2 min. | 123 | 134 | 24" |
| $Al_2O_3$, ⅓rd | 2 min. | 123 | 134 | 24" |
| Carbon Black | 2 min. | 123 | 134 | 26" |
| Scrapedown and mix | 5 min. | 127 | 134 | 26" |
| Cabosil, ¼th | 1 min. | without vacuum + scrapedown | | |
| | 2 min. | with vacuum; | | |
| Cabosil, ¼th | 1 min. | without vacuum + scrapedown | | |
| | 2 min. | with vacuum; | | |
| Cabosil, ¼th | 1 min. | without vacuum + scrapedown | | |
| | 2 min. | with vacuum; | | |
| Cabosil, ¼th | 1 min. | without vacuum + scrapedown | | |
| | 2 min. | with vacuum; | | |
| Scrapedown & mix | 5 min. | 128 | 134 | 26" |
| Scrapedown & mix | 10 min. | 128 | 134 | 26" |

Mixing is done at a moderate speed, the equivalent of a setting at 1 on a one-gallon Baker Perkins type standard vertical mixer.

CATALYST EQUIVALENCIES:

| | | | |
|---|---|---|---|
| HTPB (R45M type) with 1% 2,2-methylene-bis(4-methyl-6-tert-butyl)phenol | = | 1264.00 | ew |
| TEA | = | 49.73 | ew |
| TEA/HTPB equivalent ratio | = | 0.19 | |
| For NCO/OH (equivalent ratio of isocyanate to hydroxyl) use 0.310 g. toluene diisocyanate (TDI) for each 10 g. of premix, along with 0.55 g. additional Cabosil to eliminate flow. | = | 1.15, | |
| (TDI) toluene diisocyanate equivalent weight | = | 87.08 | |
| For NCO/OH 0.296 g. TDI are used | = | 1.10, | |

TABLE I-continued

Cure time* is 7 days at 75° F.**

g = grams
ew = equivalent weight
*Complete cure takes 2 to 3 weeks at 75° F., but restrictor is tough and rubbery after 7 days, with NCO/OH = 1.15
**At 75° F., the complete restrictor is thixotropic and will not flow. At temperature below 70° F., cure becomes sluggish, more time is required, and the cure quality is reduced somewhat.

TABLE II

|  | Behavior before start of aging | Aged 32 days at room temp in air | Aged 32 days at 140° F. in air | Aged 32 days at 140° F. under $N_2$ |
|---|---|---|---|---|
| 1. Unrestricted propellant: | | | | |
| $\sigma_{max}$, psi[1] | 116 | | | 132 |
| $\epsilon_{max}$, % | 35 | | | 35 |
| $\epsilon_{break}$, % | 39 | | | 38 |
| E, psi | 722 | | | 773 |
| 2. Restrictor alone: | | | | |
| $\sigma_{max}$, psi | 208 | 264 | 329 | 235 |
| $\epsilon_{max}$, % | 66 | 71 | 89 | 65 |
| $\epsilon_{break}$, % | * | * | * | * |
| E, psi | 380 | 454 | 468 | 436 |
| 3. Propellant with restrictor:[2] | | | | |
| $\sigma_{max}$, psi | 127 | 136 | | 145 |
| $\epsilon_{max}$, % | 32 | 31 | | 32 |
| $\epsilon_{break}$, % | 34 | 32 | | 34 |
| E, psi | 816 | 930 | | 951 |
| 4. Restrictor-to-propellant adhesive peel strength, in.-lbs. torque per inch | | 20.8 | | 16.2 |

[1] $\sigma_{max}$ = maximum tensile strength
$\epsilon_{max}$ = elongation at maximum tensile strength
$\epsilon_{break}$ = elongation at break
E = initial modulus (Young's modulus)
*specimens slipped out of holders before breaking
[2] restrictor removed from propellant prior to tensile testing This new restrictor cures at room temperatures (70°–75° F.) after application. Pot life is about three hours at room temperature. Twenty-four hours after application, the restrictor is firm enough so that such tasks as motor nozzle assembly can be accomplished without fear of restrictor damage by inadvertent bumping or touching of restricted areas. After five to seven days, the restrictor is almost completely cured to a tough, pliable rubber ready for motor firing. Complete cure takes three to four weeks at room temperature (70°–75° F.).

In normal use, the restrictor is first made in the form of a premix (see Table I). All of the ingredients except the toluene diisocyanate (TDI) curative and some of the Cabosil ($SiO_2$), a colloidal silica, are combined and mixed in a suitable mixer in the order outlined in Table I. A one-gallon vertical mixer of the type used to process solid propellants is satisfactory for this purpose.

The resulting premix is then packed in an air-tight container, and can be stored indefinitely until needed, at which time the TDI and a small amount of Cabosil ($SiO_2$) are mixed either by hand or with a simple mixer to obtain the restrictor, ready to apply to a rocket motor propellant grain.

Application can be done by hand, with a spatula on a long rod. The restrictor composition is spread over the critical surfaces of the propellant grain in about thirty minutes. A one-tenth inch thickness of restrictor has proven adequate for motor firings. The thickness need not be critically maintained; thin spots and runovers, which are bound to occur with this simple method of application, have produced no detectable effects on motor performance during firing.

A faster, more sophisticated technique of applying the resistor is possible with a pneumatic caulking gun.

No excessive hardening or loss of adhesion occurs with this restrictor on propellant during aging. For example, see Table II. The restrictor modulus always remains much lower than the unrestricted propellant modulus throughout the aging period, while restrictor strain capability remains well in excess of the propellant's capability. Furthermore, there is no excessive hardening of the propellant under the restrictor upon aging, and the restrictor-to-propellant adhesive peel strength remains high throughout aging.

All of the aforementioned factors indicate high restrictor reliability upon aging and motor firing.

The foregoing illustrates the advantages and new features of the present invention to one skilled in the art. However, this invention is not limited by the description, but only by the claims.

What is claimed is:

1. A solid propellant grain restrictor composition comprising:
   a premix containing hydroxyl-terminated polybutadiene with 1% by weight of dissolved 2,2'-methylene-bis(4-methyl-6-tert-butyl) phenol antioxidant, dioctyl adipate, triethanolamine, ferric acetylacetonate, carbon black, hydrated aluminum oxide, and colloidal silicon dioxide;
   toluene diisocyanate; and
   colloidal silicon dioxide.

2. A solid propellant grain restrictor composition according to claim 1 wherein for every 10 g of said premix present, said toluene diisocyanate is present in an amount of 0.310 g and said colloidal silicon dioxide is present in an amount of 0.55 g.

3. A solid propellant grain restrictor composition according to claim 1 wherein for every 10 g of said premix present, said toluene diisocyanate is present in an amount of 0.296 g and said colloidal silicon dioxide is present in an amount of 0.55 g.

4. A solid propellant grain restrictor composition according to claim 1, 2 or 3 wherein said premix contains, on a weight basis:
   about 32.932 percent hydroxyl-terminated polybutadiene with 1% by weight of dissolved 2,2'-methylene-bis(4-methyl-6-tert-butyl) phenol antioxidant;
   about 12.173 percent dioctyl adipate;
   about 0.244 percent triethanolamine;
   about 0.235 percent carbon black;
   about 48.787 percent hydrated aluminum oxide; and
   about 5.160 percent colloidal silicon dioxide.

* * * * *